July 8, 1952  C. A. LYON  2,602,705
WHEEL COVER
Filed Feb. 26, 1947
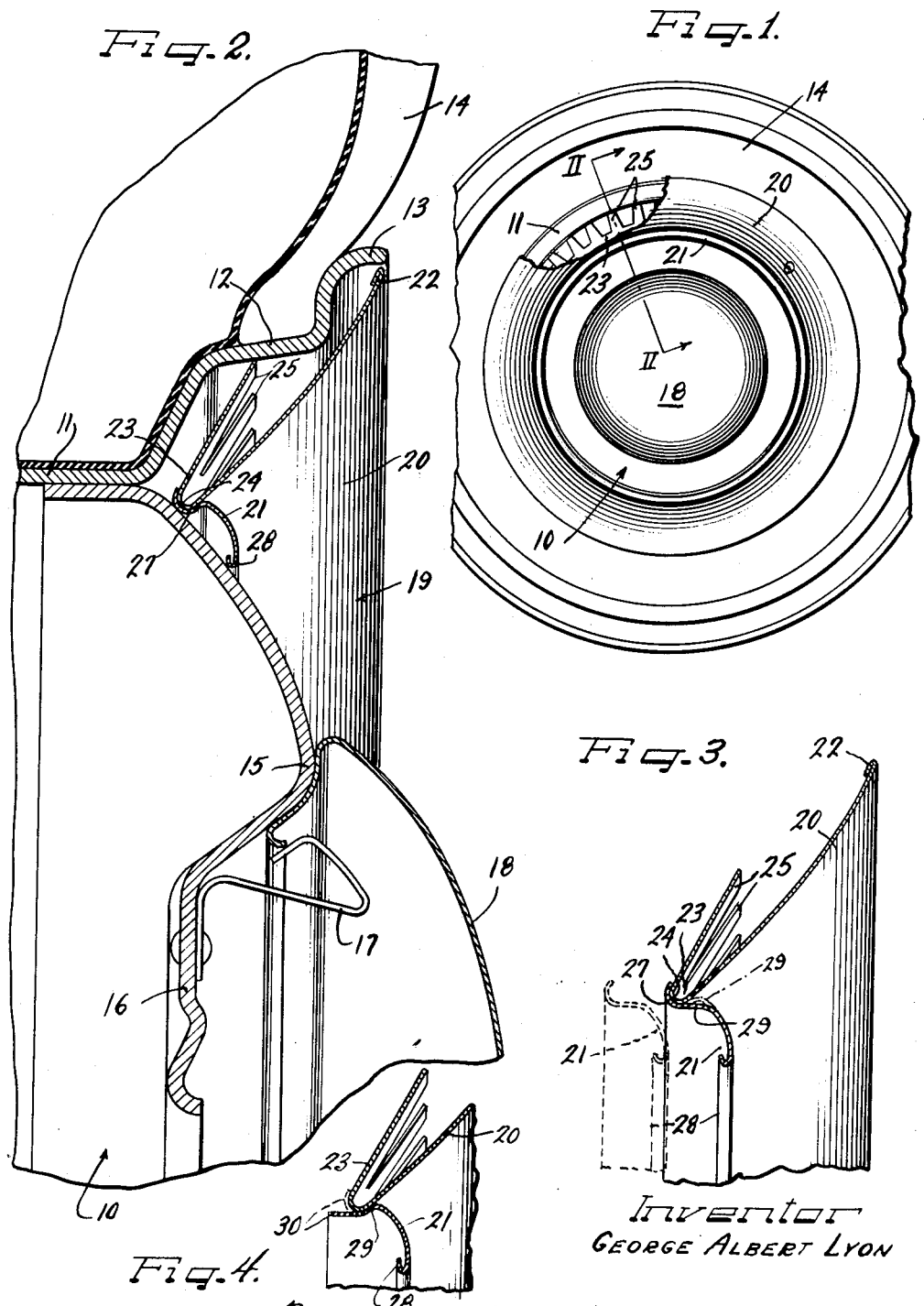
Inventor
GEORGE ALBERT LYON Patented July 8, 1952

2,602,705

UNITED STATES PATENT OFFICE 2,602,705

WHEEL COVER

George Albert Lyon, Detroit, Mich.

Application February 26, 1947, Serial No. 731,029

6 Claims. (Cl. 301—37)

This invention relates to improvements in wheel structures, and more particularly concerns a new and improved cover structure for vehicle wheels.

An important object of the present invention is to provide a new and improved wheel cover for vehicle wheels which is adapted to be produced more economically than prior similar types of wheel covers.

Another object of the invention is to provide an improved vehicle wheel cover of the type which is self-attaching upon assembly with the wheel.

A further object of the invention is to provide a novel wheel trim adapted to become a more or less permanent part of the wheel assembly.

Still another object of the invention is to provide a composite vehicle wheel cover which is constructed and assembled in a novel manner.

According to the general features of the invention there is provided in a wheel structure including a multi-flanged tire rim and a load sustaining body part, a cover structure including a trim ring having a magnitude and extent to cover the outer side of the tire rim and formed with a return bent inner marginal portion having a plurality of retaining teeth thereon engageable with the tire rim for retaining the cover in place, and a reenforcing ring assembled with the juncture of the return bent portion and the body of the trim ring and affording a seating structure for the trim ring on the body of the wheel.

According to other general features of the invention, the reenforcing ring is formed with an outwardly opening groove within which the shoulder provided by the juncture of the return bent retaining flange of the trim ring is nested.

According to other general features of the invention, the reenforcing ring includes a generally radially inwardly projecting portion affording an ornamental bead convergently disposed relative to the trim ring portion of the cover.

According to other features of the invention, the trim ring portion of the cover and the reenforcing ring portion of the cover are adapted to be formed from separate rolled sections and are then united by internesting and crimping operations.

It is a further feature of the invention to assemble separately formed trim ring and reenforcing ring members of a wheel cover by internestingly assembling the rings and then bending a portion of the reenforcing ring into interlocking relation to the engaged portion of the trim ring member.

Other objects, features and advantages of the present invention will be readily apparent from the following detailed description of certain preferred embodiments thereof taken together with the accompanying drawings, in which:

Figure 1 is a side elevational view of a vehicle wheel including a cover structure according to the present invention;

Figure 2 is an enlarged fragmentary radial sectional view taken substantially on line II—II of Fig. 1;

Figure 3 is a radial sectional view through the trim ring cover assembly showing various steps in one method of assembling the trim ring and seating ring portions of the assembly; and Figure 4 is a sectional view similar to Fig. 3 showing a modified method of effecting final assembly of the components of the trim structure.

As shown on the drawings:

A vehicle wheel with which the present invention is adapted to be used comprises a wheel body 10 and a multi-flanged drop center type of tire rim 11 which is formed with the usual multi-flanged side structure including an intermediate axial flange 12 and a curved terminal or outer side flange 13. The tire rim 11 is adapted to receive a pneumatic tire and tube assembly 14. The wheel body 10 is preferably formed from sheet metal bent to appropriate shape which includes an annular or axially outwardly protruding reinforcing nose bulge 15 defining a central bolt-on flange structure 16 which may be equipped with retaining clips 17 for holding a hub cap 18 in place.

For ornamentally concealing the outer side of the multi-flange tire rim 11 and the juncture between the tire rim and the wheel body 10, a cover assembly 19 is provided which includes a trim ring portion 20 and a reenforcing ring portion 21.

The trim ring portion 20 is preferably formed of a convex cross sectional shape to extend from the tire rim terminal flange 13 generally radially and axially inwardly to the body portion 10 of the wheel radially inwardly from the juncture of the body with the tire rim 11. The curvature of the trim ring member 20 is preferably approximately like that of the side wall of the tire 14 and where colored white affords simulation of a white side wall radial inward extension of a massive tire supported by the tire rim 11. The outer edge of the trim ring member 20 is preferably return bent to afford an outer marginal reinforcement as indicated at 22.

In order to secure the cover 19 to the wheel, the inner marginal portion of the trim ring member 20 is formed with a generally radially outwardly extending return bent flange 23 having an integral curving juncture 24 with the body of the trim ring member. The flange 27 diverges from the general curving plane of the trim ring 20 and extends therebehind in a generally radially and axially outward direction and is formed with a series of retaining fingers 25 which are disposed on a circumference such that when the cover is pressed axially inwardly into assembly with the wheel the fingers 25 enter into biting, wedging engagement with the radially inner side of the intermediate generally axially extending flange 12 of the tire rim.

Reenforcement and a finished ornamental appearance is afforded for the inner margin of the trim ring 20, where it encounters the wheel body, by the reenforcing ring member 21. The stiffening afforded thereby assures that the cover will maintain a uniform contour and will seat uniformly on the wheel body. For this purpose, the reenforcing ring 21 is formed to engage the shoulder provided by the rounded juncture 24 and is therefore formed with an outer marginal groove 27 which nestingly engages the juncture shoulder 24. The body portion of the seating ring 21 which extends radially inwardly from the juncture with the trim ring member 20 is of pleasing convex cross section and merges with an inner marginal turned-under reinforcing and finishing flange 28. The groove formation 27 and the inner reinforcing flange 28 are disposed in a plane which is complementary to the opposing surface of the wheel body 10 so that in full assembly, the ring 21 makes substantially uniform contact adjacent to both of its margins with the wheel body.

A substantial advantage gained from the trim ring construction of the present invention resides in the fact that both the trim ring portion 20 and the reinforcing and seating ring portion 21 are adapted to be made from relatively thin sheet metal as rolled sections rather than stampings and can therefore be made considerably more economically than is possible with stamped types of covers.

Prior to assembly of the reinforcing ring 21 with the trim ring member 20, the formation of the ring 21 is such that the two separately formed members can be brought into preliminary assembly by relative axial movement. To this end, the groove formation 27 of the ring 21 may initially be formed wider than its finally assembled formation (Fig. 3) so as to provide an interlock shoulder 29 at its inner side which is initially of a diameter to clear the juncture shoulder 24 of the trim ring member 20. After preliminary assembly has been effected, the interlock shoulder 29 is spun or crimped or pressed into interlocking relation with the trim ring member 20, substantially as shown in Fig. 3, from the full line position to the dot-dash position.

On the other hand, the preliminary assembly may be effected by just the reverse relative axial assembly movement by having the groove formation 27 initially formed with an interlock flange 30 extending generally axially inwardly clear of the juncture shoulder 24 so that initial assembly can be effected by moving the ring in relative axial assembly direction with the seating ring 21 in front of the trim ring member 20. In this manner the interlock shoulder 29 is initially straight until the trim ring member 20 and the reenforcing ring have been initially assembled and thereafter the interlock flange 30 is bent by spinning or crimping or pressing it over into interlocking relation with the inner marginal portion of the retaining flange 23, as shown in Fig. 4.

After final assembly of the ring members 20 and 21, utilizing either method of assembly, the cover structure forms a unitary assembly of substantial rigidity wherein the retaining flange 23 and the retaining fingers 25 thereof are sufficiently resilient to yield to the extent necessary for mounting the cover on the wheel.

The return bent relationship of the flange 23 at the inner margin of the trim ring member 20 affords a certain amount of reenforcement in the first instance and the reenforcing ring 21 greatly supplements such inner marginal reenforcement for the trim ring member 20 and also affords a uniform seating medium for the trim ring and an attractively finished inner edging therefor.

I claim as my invention:

1. In a wheel structure including a multi-flanged tire rim including a base flange and an intermediate generally axially extending flange offset radially outwardly relative to said base flange and a load sustaining body part secured to said base flange, a cover structure including a trim ring having a magnitude and extent to cover the outer side of the tire rim and formed with a return bent inner marginal portion having a plurality of retaining teeth thereon engageable with the intermediate flange of the tire rim for retaining the cover in place, and a reinforcing ring assembled with the juncture of the return bent portion and the body of the trim ring and affording a seating structure for the trim ring on the body of the wheel.

2. In a wheel structure including a multi-flanged tire rim including a base flange and an intermediate generally axially extending flange offset radially outwardly relative to said base flange and a load sustaining body part secured to said base flange, a cover structure including a trim ring having a magnitude and extent to cover the outer side of the tire rim and formed with a return bent inner marginal portion having a plurality of retaining teeth thereon engageable with the intermediate flange of the tire rim for retaining the cover in place, and a reinforcing ring assembled with the juncture of the return bent portion and the body of the trim ring and affording a seating structure for the trim ring on the body of the wheel, the reinforcing ring being formed with an outwardly opening groove within which the shoulder provided by the juncture of the return bent retaining flange of the trim ring is nested.

3. In combination in a trim structure for vehicle wheels, a trim ring member and a reinforcing and seating ring member interlockingly engaging the inner marginal portion of the trim ring member, the inner margin of the trim ring member carrying means for securing the assembly to the wheel, said means comprising a plurality of radially extending fingers extending radially and axially outwardly behind the trim ring member and engageable with a part of the tire rim of a vehicle wheel.

4. In a cover structure of the character described, an ornamental bead having the radially inner margin thereof turned under and being of convex cross section, the radially outer margin of the bead being of concave cross section to provide a generally radially and axially outwardly opening annular groove, said turned margin and said convex portion affording annular seating rims for the bead in mounting the same upon a wheel, and an annular trim member of generally wedge-shape radial cross section having the tip of the wedge seated in said groove and including a portion extending from the tip in said groove having means for engagement with a wheel and a concealing ornamental body part cooperating with the bead in affording an ornamental cover for the wheel.

5. In combination in an ornamental wheel cover, a one piece sheet metal trim ring including an annular body having the inner margin thereof turned under and providing a generally radially outwardly extending flange including a series of radially outwardly extending retaining fingers for retainingly engaging with an intermediate flange of a tire rim, said body and said flange and fingers converging generally wedge-like when considered in radial cross section and having a small radius generally radially inwardly projecting juncture shoulder, and a circular trim member having a body portion disposed radially inwardly from said juncture shoulder and having at its radially outer margin a radially outwardly opening groove within which said juncture shoulder is snugly nested, said groove being defined at the axially inner side by a flange engaging at the axially inner side of said juncture shoulder and being defined at the axially outer side by an interlock shoulder engaging at the axially outer side of said juncture shoulder of the trim ring.

6. In combination in an ornamental wheel cover, a one piece sheet metal trim ring including an annular body having the inner margin thereof turned under and providing a generally radially outwardly extending flange including a series of radially outwardly extending retaining fingers for retainingly engaging with an intermediate flange of a tire rim, said body and said flange and fingers converging generally wedge-like when considered in radial cross section and having a small radius generally radially inwardly projecting juncture shoulder, and a circular trim member having a body portion disposed radially inwardly from said juncture shoulder and having at its radially outer margin a radially outwardly opening groove within which said juncture shoulder is snugly nested, said groove being defined at the axially inner side by a flange engaging at the axially inner side of said juncture shoulder and being defined at the axially outer side by an interlock shoulder engaging at the axially outer side of said juncture shoulder of the trim ring, said trim member being in the form of a reinforcing and ornamental bead providing a seat at the inner margin of the trim ring for engagement with a wheel body, the inner margin of the trim member being turned under and providing a seating portion for engagement with the wheel body.

GEORGE ALBERT LYON.

REFERENCES CITED

The following references are of record in the file of this patent:

UNITED STATES PATENTS

| Number | Name | Date |
| --- | --- | --- |
| Re. 22,119 | Lyon | June 16, 1942 |
| 2,162,733 | Lyon | June 20, 1939 |
| 2,368,230 | Lyon | Jan. 30, 1945 |
| 2,368,246 | Lyon | Jan. 30, 1945 |
| 2,368,247 | Lyon | Jan. 30, 1945 |
| 2,386,226 | Lyon | Oct. 9, 1945 |
| 2,386,229 | Lyon | Oct. 9, 1945 |
| 2,406,390 | Lyon | Aug. 27, 1946 |